Sept. 26, 1972  T. E. PIAZZE  3,694,289
APPARATUS FOR MAKING HEAT SEALED TUBES
Filed June 22, 1970  2 Sheets-Sheet 1
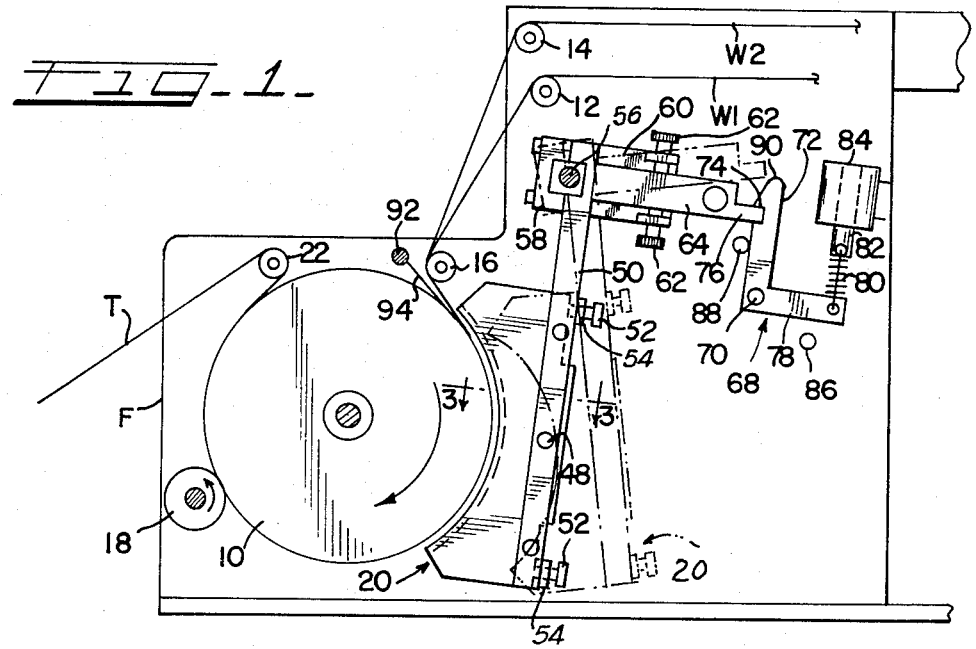
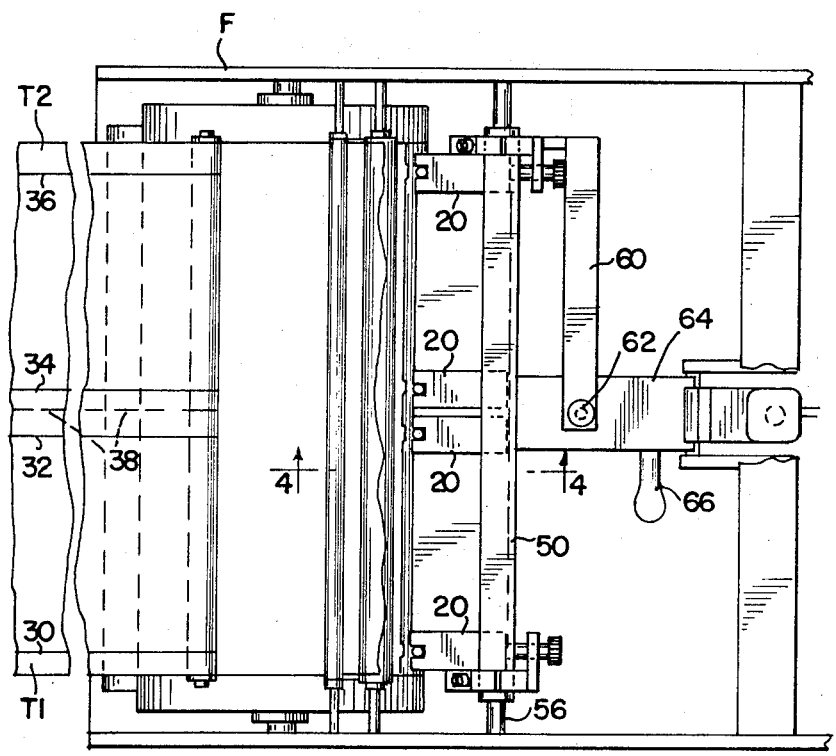
INVENTOR
THOMAS E. PIAZZE
ATT'YS.

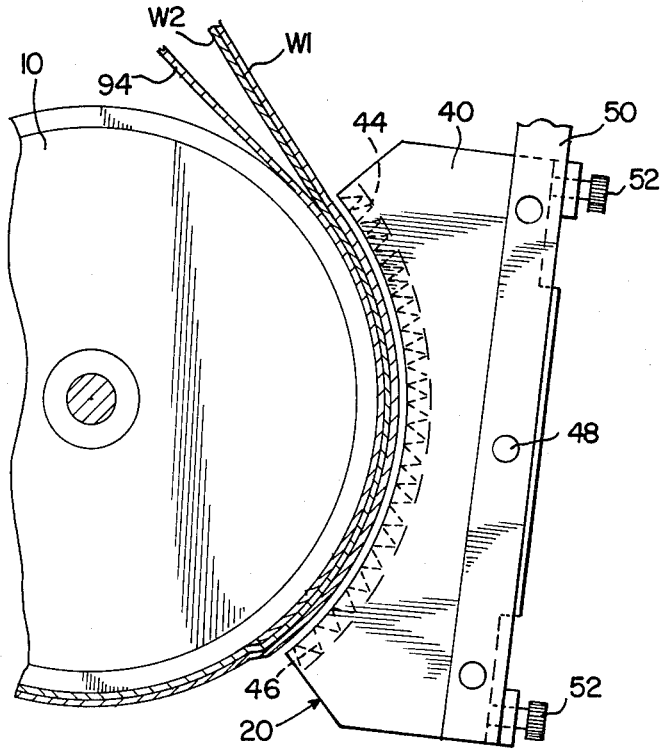
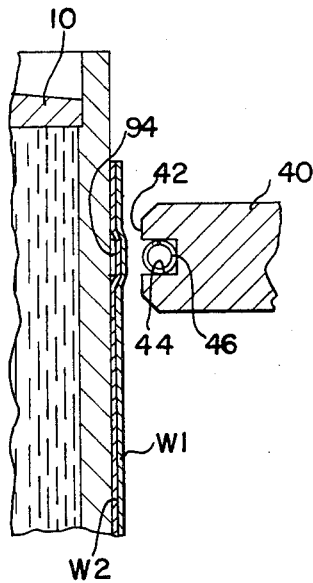
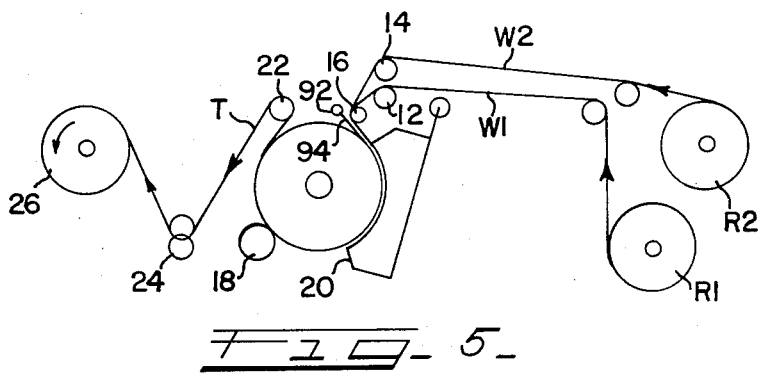
INVENTOR
THOMAS E. PIAZZE
ATT'YS.

United States Patent Office 3,694,289
Patented Sept. 26, 1972

3,694,289
APPARATUS FOR MAKING HEAT SEALED TUBES
Thomas E. Piazze, Mount Vernon, Ohio, assignor to
Continental Can Company, Inc., New York, N.Y.
Filed June 22, 1970, Ser. No. 48,331
Int. Cl. B29c 27/00
U.S. Cl. 156—380
4 Claims

ABSTRACT OF THE DISCLOSURE

An apparatus for fabricating multiple tubes from heat sealable film material in a continuous operation which comprises a cooling drum, means for guiding webs of the film material from a pair of supply rolls into superimposed relation and about a portion of the periphery of the cooling drum, radiant heat sealing devices spaced in paired relation axially of the drum which form relatively narrow, parallel, axially spaced seams in the superimposed material, and narrow flexible strips of material disposed so as to lie between the film and the peripheral surface of the drum so as to form ribs on the latter at the seam forming areas, the strips serving to hold the seam forming portions of the material in surface engagement while the seal is being formed and also constituting a heat transfer barrier.

---

This invention relates to the fabrication of tubes from continuous films of heat sealable material and is more particularly concerned with improvements in a method and apparatus for continuously forming tubular stock from films of heat sealable material which is brought together in superimposed relation and sealed on continuous, spaced, longitudinal lines which define the side edges of the finished tube material.

It is a more specific object of the invention to provide a method of forming a tube or tubes from webs of heat sealable material wherein the webs are guided into overlapping relation and the overlapped material is carried around the curved surface and sealed on spaced lines extending longitudinally of the material by being subjected to radiant heat sealing devices.

It is a more specific object of the invention to provide a method and an apparatus for forming a tube or tubes from heat sealable material wherein two or more webs of extruded or cast film plastic sheet material are brought into superimposed relation and guided around a cooled drum with sufficient tension to hold the surfaces in engagement while they are welded along continuous, parallel, spaced lines, or seam forming areas, by radiant heat and held in spaced relation to the surface of the drum by interposed strips of flexible textile-like material forming a heat transfer barrier beneath the seam forming areas of the material.

A further object of the invention is to provide a tube forming machine of the character described having a water cooled drum around the surface of which the heat sealable web material is guided in superimposed relation with relatively narrow radiant heaters extending about a portion of the drum surface in spaced relation thereto and spaced axially a distance corresponding to the desired width of the collapsed tube and with narrow flexible strips of material having a substantial degree of resistance to the transfer of heat arranged between the surface of the drum and the seam forming areas of the material.

These and other objects and advantages of the invention will be apparent from a consideration of the tube forming method herein described and the mechanism which is illustrated in the accompanying drawings as particularly adapted for carrying out the tube forming operations.

In the drawings:
FIG. 1 is a side elevation, with portions of the supporting frame structure broken away or omitted, which shows a tube forming apparatus having incorporated therein the principal features of the invention;
FIG. 2 is a top plan view of the tube forming apparatus with portions thereof broken away or omitted;
FIG. 3 is a fragmentary cross section taken on the line 3—3 of FIG. 1, to an enlarged scale;
FIG. 4 is a cross section taken on the line 4—4 of FIG. 2; and
FIG. 5 is a schematic illustration of the tube forming method.

The apparatus which is illustrated in the drawings is adapted to fabricate a plurality of tubes from elastomeric, heat sealable material such as polyethylene, Pliofilm or the like which is suitable for use as stock material for a bag making machine or for any other use desired.

Referring first to FIGS. 1 and 5 of the drawings, a pair of webs W1 and W2 of suitable heat sealable film material are guided to a drum 10 and fed in superimposed relation around the major portion of the drum periphery. The webs W1 and W2 are supplied from mill rolls R1 and R2 and guided over rollers 12 and 14 to a combining roll 16 which is supported adjacent the periphery of the drum 10. The superimposed webs W1 and W2 are continuously advanced around the periphery of the rotatable drum by a driven feed roll 18 and sealed on lines which are parallel and spaced the desired distance apart to form one or more continuous tubes in flattened condition. The sealing is accomplished by radiant heat sealing devices 20 which are spaced axially of the drum in paired relation. The drum 10 is connected to a liquid cooling line, for example, water and the tube material T is held in contact with the cooled drum surface for a sufficient period after it leaves the sealing devices 20 to cool the seals. The sealed material passes over a guide roller 22 and is advanced to a pair of slitting rolls 24 which divide the material into separate individual tubes and the latter are advanced to a rewind roll 26 or directly to a bag making machine, as desired.

In the apparatus as illustrated, the web material W1 and W2 is sealed as shown in FIG. 2 on the lines 30, 32, 34 and 36 so as to provide a pair of tubes T1 and T2 when the sealed material is slit on the line 38 between the seam forming seal lines 32 and 34.

The drum 10 which provides a support for the material while the seals are being formed is of substantial diameter and is mounted for rotation in the direction of the arrow indicated in FIG. 1 with a suitable driving means (not shown). The drum 10 is mounted on a supporting frame F which may be, for example, part of a bag making machine. The drum is supplied with a circulating cooling fluid, such as water, in any conventional manner. The drum 10 has an axial dimension which depends upon the number of tubes it is desired to form thereon and the width of the tubes or the distance apart of the sealing lines or seams. In the form of the apparatus illustrated two tubes are being formed which requires the use of four radiant heater devices 20. The heating devices 20 are spaced, as shown in FIG. 2, in paired relation so as to provide four continuous parallel seams. The seams or sealing lines at 30, 32, 34 and 36 in FIG. 2 are spaced laterally so that seams 30 and 36 form the outermost edges of the tubes T1 and T2 and these seams are spaced laterally from the seams 32 and 34 the desired width of the tubes. The innermost seams 32 and 34 are spaced a sufficient distance apart to permit slitting on the line 38 so as to divide the sealed material into the two flattened tube sections T1 and T2.

Each of the heat sealing devices 20 comprises a holder 40 having a relatively narrow edge or face 42 in which there is a recess 44 for receiving a heating coil 46, the latter being heated to the desired temperature by forming the same of a material having a high electrical resistance and passing a suitable current through the same. The surface 42 of the holder 40 has a curvature corresponding to the curvature of the drum 10 and is mounted so as to be spaced, in the operative position, a relatively small distance from the surface of the material in which the seams are being formed, thereby subjecting the seam forming areas of the material to radiant heat. As shown in FIG. 1, the holder 40 is mounted on a pivot 48 on a supporting frame 50 and held in adjusted position by a pair of adjusting screws 52 mounted on cross bars 54 on the frame 50 which are spaced on either side of the mounting pivot 48. The frame 50 is in turn supported on a pivot shaft 56 with an adjustable clamp member 58. A further adjustment is provided by an arm 60 and adjusting screw 62 which engage a trip bar 64 extending radially from the pivot shaft 56.

The arm 64 has a laterally extending handle 66 and provides a means for manually swinging the frame 50 about the pivot shaft 56 through an arc sufficient to move the holder or housing 40 and heating element 46 out of operative position when it is desired to discontinue the sealing of the material. A latch arrangement is provided in the form of an angle member 68 mounted on pivot 70 and having the latch arm 72 with a slot 74 in the edge thereof for receiving a reduced end portion 76 on the handle member 64. The other arm 78 of latch member 68 has its outer end connected by a pull spring link 80 with the free end of a solenoid core 82 of an operating solenoid 84 which is connected to a power line through an on-off switch (not shown). Stop members 86 and 88 limit the movement of the arms 78 and 72 in clockwise and counterclockwise directions, respectively, as viewed in FIG. 1. The latch arm 72 has a tapered end at 90 so as to permit the arm 64 to be moved into position to bring the housing 40 into operative, sealing relation relative to the surface of the drum 10.

A supporting bar 92 extends in a direction above the surface of the drum 10 which is parallel with the drum axis and adjacent the compounding roller 16. At each of the radiant heater devices 20 a rib forming flexible strip 94 of cotton textile or other material having similar body and non-heat conducting properties is fastened at one end to the bar 92 and extends in contact with the peripheral surface of the drum 10 beneath the superimposed webs W1 and W2 to a point adjacent the bottom end of the heater element 46. The rib forming member 94, which may be, for example, in the form of a length of flat cotton shoestring has sufficient thickness, as indicated in FIG. 3, to cause a bulge in the webs W1 and W2 which results in holding in close contact the opposed surfaces of the web material along the sealing line. Longitudinal stretching or tension in the web material resulting from the pull on the same by the feed roller 18 will cause the web surfaces to lie flat on each other. This insures continuous sealing and eliminates any interruptions in seam forming which might otherwise occur, due to wrinkling or unevenness in the material.

I claim:

1. A machine for continuously forming tubes from webs of heat sealable material comprising a rotatably mounted drum, a plurality of radiant heaters each having a relatively narrow arcuate surface of substantial length, which heaters are each arranged with said arcuate surface in spaced relation to the surface of said drum so as to apply radiant heat sufficient to seal material carried on said drum surface, said heaters being disposed in paired relation and spaced in the axial direction of the drum a predetermined distance apart, the distance corresponding to the width of the flattened tube it is desired to form thereon, means for feeding webs of said heat sealable material and means for guiding the material into superimposed relation and to bring seam forming areas into overlying relation with the underlying web material contacting portions of the surface of the drum which are opposed to said heaters, and a narrow strip of flexible woven textile material having substantial resistance to the transfer of heat disposed beneath each of said seam forming areas and in engagement with a portion of the drum surface which is opposite an associated heater whereby to prevent heat transfer as seams are formed on the seam forming areas of said material by said heaters.

2. A machine as set forth in claim 1 wherein said strip of woven textile material is of substantial thickness so as to form a resilient rib beneath the seam forming area which will tension the material laterally of the direction of feed when tension is applied to the material in the direction of feed whereby to hold the opposed faces of the material in the seam forming areas in substantially uniform contacting relation during the formation of the seam.

3. A machine for continuously forming tubes from webs of heat sealable material comprising a rotatably mounted drum, a plurality of radiant heaters which are of substantial length each having a relatively narrow arcuate surface arranged in spaced relation to the surface of said drum which surface has a curvature corresponding approximately to the surface of the drum and spaced sufficiently close to said drum surface so as to apply radiant heat of a degree sufficient to seal seam forming areas of the material carried on the drum surface, said heaters being arranged in paired relation and the pairs thereof being spaced in the axial direction of the drum a predetermined distance apart so as to form seals which divide the material into a plurality of tubes with the heaters of each pair thereof spaced a distance apart which corresponds to the desired width of the flattened tube to be formed thereby, means for feeding webs of said heat sealable material and guiding the same in superimposed relation about a portion of the surface of the drum which is opposed to said heaters, a narrow flexible strip of textile material disposed in engagement with the surface of the drum which is opposed to each of said heaters and beneath the seam forming areas of the superimposed material so as to form a heat transfer barrier whereby seams are formed in the superimposed material by said heaters.

4. A machine as set forth in claim 3, wherein a driven pull means is positioned for engaging the web material at a point beyond the ends of the radiant heaters which pull means is operative to advance the web material with predetermined tension so as to co-operate with said strips of textile material to draw the seam forming portions thereof into contact for uniform sealing, and wherein said drum is provided with a cooling means and said pull means is spaced about the periphery of said drum a predetermined distance from said heaters whereby to hold the seamed material in engagement with the surface of the drum so as to cool the seam.

References Cited

UNITED STATES PATENTS

| 2,587,211 | 2/1952 | Piazze | 156—203 |
| 2,958,367 | 11/1960 | Gournelle | 156—380 |
| 3,247,041 | 4/1966 | Henderson | 156—272 |
| 3,383,265 | 5/1968 | Garabedian | 156—380 |

DOUGLAS J. DRUMMOND, Primary Examiner